A. EDWARDS.
IRONING BOARD.
APPLICATION FILED JULY 16, 1915.
1,182,540.
Patented May 9, 1916.
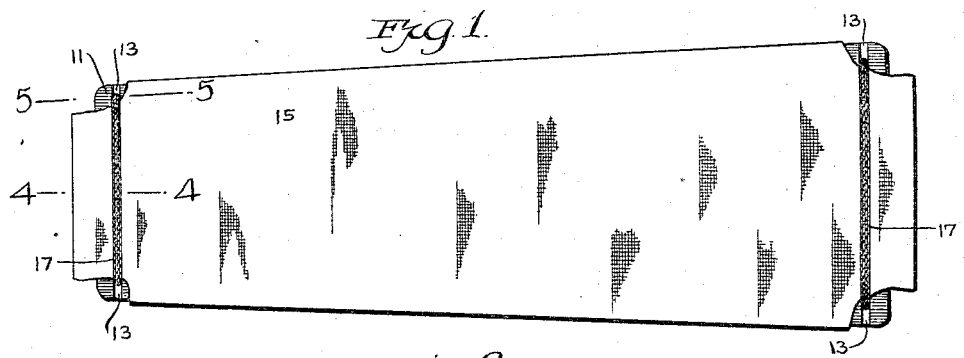
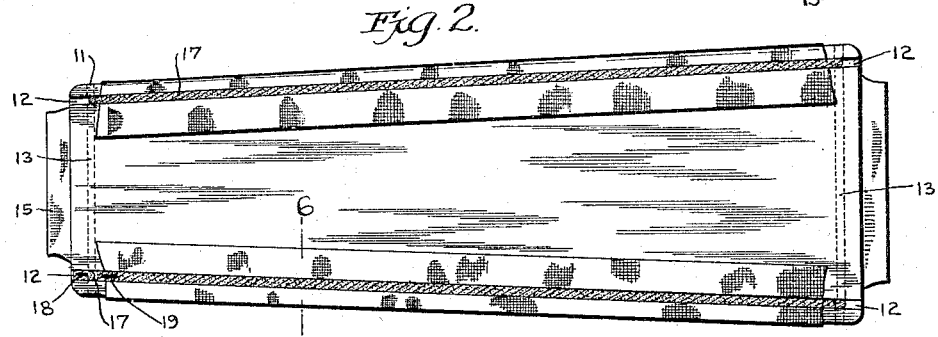
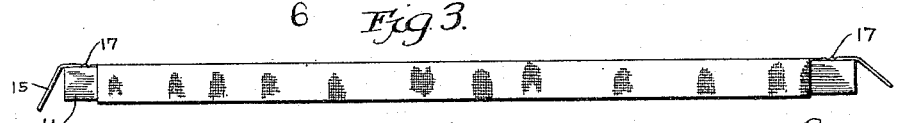
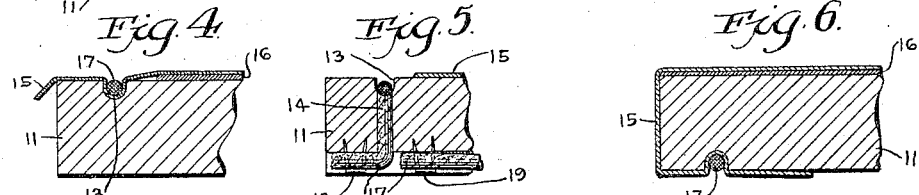
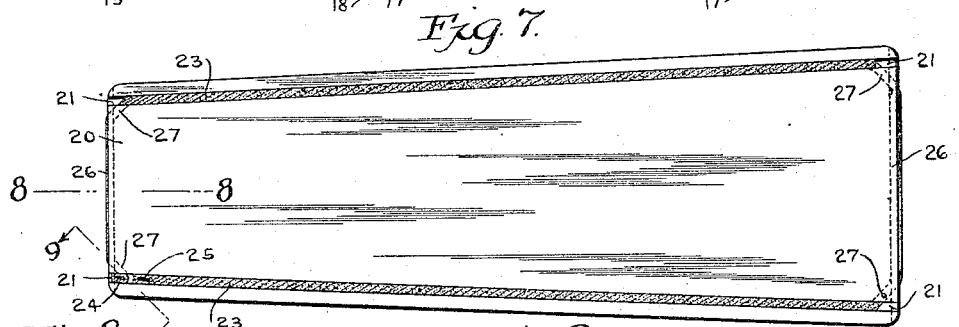
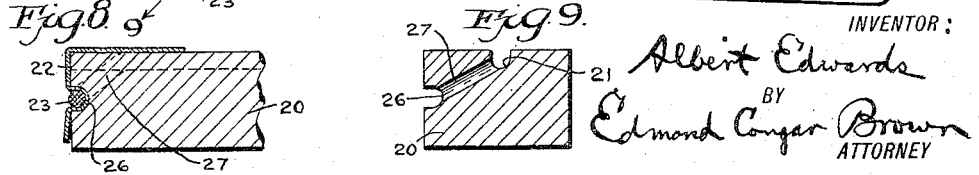
INVENTOR:
Albert Edwards
BY
Edmond Conger Brown
ATTORNEY

UNITED STATES PATENT OFFICE.

ALBERT EDWARDS, OF NEW YORK, N. Y.

IRONING-BOARD.

1,182,540.  Specification of Letters Patent.  Patented May 9, 1916.

Application filed July 16, 1915. Serial No. 40,259.

*To all whom it may concern:*

Be it known that I, ALBERT EDWARDS, a citizen of the United States, and a resident of the borough of Brooklyn, city and State of New York, have invented certain new and useful Improvements in Ironing-Boards, of which the following is a specification.

My invention relates to ironing boards, and has for some of its objects to provide a board which may be easily and cheaply made, of simple construction, and to which a cover may be easily and securely fastened.

My invention consists in the novel construction, arrangement and combination of parts, as shown in the accompanying drawings and fully described in this specification.

In the said drawings, Figure 1 is a top view of one embodiment of my invention, with cover attached; Fig. 2 is a bottom view thereof; Fig. 3 is a side view; Fig. 4 is a section on an enlarged scale taken on the line 4—4 of Fig. 1; Fig. 5 is a section also on an enlarged scale taken on the line 5—5 of Fig. 1; Fig. 6 is an enlarged sectional view taken on the line 6—6 of Fig. 2; Fig. 7 is a bottom view of another embodiment of my invention, with cover removed; and Figs. 8 and 9 are sections on an enlarged scale taken respectively on the line 8—8 and 9—9 of Fig. 7.

In carrying my invention into effect in the embodiment thereof shown in Figs. 1 to 6 inclusive, I provide a board 11 of suitable size and shape. This board is provided on the bottom surface with a longitudinal groove 12 near each side, and on the top surface with a transverse groove 13 near each end. The board is also provided with a perforation 14 (see particularly Fig. 5) near each corner, at the intersection of the planes of the grooves 12 and 13.

I provide a cover 15 for the ironing board and of approximately the same shape, but large enough to be turned over the edges of the board at the sides and ends. The corners of this cover, however, are cut away, so that when it is in place the perforations 14 will be exposed. A pad 16 between the cover and the face of the board may be provided if desired. I also provide a cord 17, one end of which is secured in one end of one of the grooves 12 by means of a staple 18. The cord passes upward through the adjacent perforation 14, through one of the grooves 13 to the opposite side of the board, downward through a perforation 14, lengthwise of the board in a groove 12, upward through a perforation 14, crosswise of the board in a groove 13, downward through a perforation 14, and then lengthwise of the board in a groove 12 to its original starting point, where it is secured by a staple 19.

When it is desired to use the board, the cover 15 is placed thereon, over the pad 16, in such a position that the central part of the board will be covered up, leaving the corners, and the perforation 14, uncovered. The two side flaps, and the two end flaps, which are formed in the cover by cutting away the corners, are tucked under the cord 17, which is sufficiently elastic to be raised out of the grooves for the purpose, the end flaps lying in the grooves 13, and the side flaps in the grooves 12. By this means the cover is securely held in close contact with the board, but may be removed at any time desired by pulling the side and end flaps out of their respective grooves and from under the cord 17. The cord may remain permanently in place.

In the embodiment shown in Figs. 7, 8 and 9, I provide a board 20, having longitudinal grooves 21, a cover 22, and a cord 23 secured by staples 24 and 25, all substantially analogous to the embodiment shown in Figs. 1 to 6. In place of the transverse grooves 13, however, a groove 26 is provided, extending the length of each end of the board (as clearly shown in Figs. 8 and 9) and instead of the perforations 14, perforations 27 are provided, extending diagonally downward and diagonally toward the center of the board, connecting the grooves 21 and 26, and running between points near the ends of these grooves. (See particularly Fig. 9). The operation of this embodiment is substantially similar to that of the first described form.

The advantages of my invention are obvious from what has been above said concerning its construction and mode of operation.

I do not limit myself to the exact forms shown and described, as it is obvious that various changes might be made, without departing from the spirit and scope of my invention. For instance, the longitudinal grooves could be placed on the top, and the transverse grooves on the bottom, or all the grooves might be placed on the top. I believe, however, that the arrangements shown are preferable, as it is desirable to have a smooth surface extending from side to side of the board. The exact method of attaching the ends of the cords is immaterial. It is not necessary, theoretically, to have the grooves extend the full length or breadth of the board, the only requirement being that they should connect the perforations. In practice however, I have found it to be much more difficult to cut out a groove which shall only connect the perforations than one running the entire length or breadth of the board. The grooves are accordingly shown and described as running entirely across the board.

Having thus described my invention, what I claim as new and desire to secure by Letters Patent is as follows:

1. An ironing board provided with a pair of approximately parallel grooves located on one surface thereof, a second pair of approximately parallel grooves situated elsewhere on said board and extending approximately at right angles to said first named grooves, perforations extending between said grooves, and a cord lying in said grooves and passing through said perforations.

2. An ironing board provided with a longitudinal groove, a transverse groove, a perforation extending between said grooves, and a cord lying in said grooves and passing through said perforation.

3. An ironing board provided with a longitudinal groove on one surface, a transverse groove on one end, a perforation extending between said grooves, and a cord lying in said grooves and passing through said perforation.

4. An ironing board provided with a longitudinal groove on one surface and extending its entire length, a transverse groove on one end extending its entire breadth, a perforation extending between said grooves, and a cord lying in said grooves and passing through said perforation.

5. An ironing board provided with a longitudinal groove on one surface, a transverse groove on one end, a perforation extending from said longitudinal groove at a point near one end thereof, diagonally into said board and diagonally toward the center thereof, to said transverse groove at a point near one end thereof, and a cord lying in said grooves and passing through said perforation.

In witness whereof I have hereunto signed my name this 14th day of July 1915.

ALBERT EDWARDS.

Copies of this patent may be obtained for five cents each, by addressing the "Commissioner of Patents, Washington, D. C."